(12) United States Patent
Moini et al.

(10) Patent No.: US 8,193,114 B2
(45) Date of Patent: Jun. 5, 2012

(54) CATALYSTS FOR DUAL OXIDATION OF AMMONIA AND CARBON MONOXIDE WITH LOW TO NO $NO_x$ FORMATION

(75) Inventors: Ahmad Moini, Princeton, NJ (US); Gerald S. Koermer, Basking Ridge, NJ (US); Pascaline Harrison Tran, Holmdel, NJ (US); Jacqueling S. Curran, Cranford, NJ (US)

(73) Assignee: BASF Catalysts LLC, Iselin, NJ (US)

( * ) Notice: Subject to any disclaimer, the term of this patent is extended or adjusted under 35 U.S.C. 154(b) by 274 days.

(21) Appl. No.: 11/560,181

(22) Filed: Nov. 15, 2006

(65) Prior Publication Data

US 2008/0112870 A1    May 15, 2008

(51) Int. Cl.
*B01J 23/00*    (2006.01)
(52) U.S. Cl. .......... 502/324; 502/54; 502/103; 502/340; 502/344; 423/237; 423/239.1; 423/246; 423/247
(58) Field of Classification Search ................ 423/235, 423/237, 239.1, 246, 247; 502/34, 54, 103, 502/304, 324, 340, 344
See application file for complete search history.

(56) References Cited

U.S. PATENT DOCUMENTS

| | | | |
|---|---|---|---|
| 4,781,902 A * | 11/1988 | Schoubye .................. | 423/239.1 |
| 4,961,917 A | 10/1990 | Byrne | |
| 5,104,629 A | 4/1992 | Dreschler | |
| 5,108,977 A * | 4/1992 | Yoshida et al. ................ | 502/304 |
| 5,727,385 A | 3/1998 | Hepburn | |
| 6,033,640 A | 3/2000 | White | |
| 6,117,813 A | 9/2000 | McCauley et al. | |
| 6,455,463 B1 | 9/2002 | LaBarge et al. | |
| 6,482,377 B2 * | 11/2002 | Bartley et al. .............. | 423/213.2 |
| 6,489,264 B1 | 12/2002 | Isupova et al. | |
| 6,727,202 B2 | 4/2004 | Deeba et al. | |
| 6,797,663 B2 | 9/2004 | Watanabe et al. | |
| 6,833,125 B2 | 12/2004 | Cremona et al. | |
| 6,852,666 B1 * | 2/2005 | Bouly et al. ................... | 502/304 |
| 7,045,056 B2 | 5/2006 | Kelkar et al. | |
| 7,078,004 B2 | 7/2006 | Voss et al. | |

(Continued)

FOREIGN PATENT DOCUMENTS

EP    1570903    9/2005

OTHER PUBLICATIONS

Milt, V G et al., "Abatement of diesel exhaust pollutants: NOx adsorption on Co,Ba, K/CeO2 catalysts", *Journal of Catalysis 220* (2003), (2003),424-432.

(Continued)

*Primary Examiner* — Ula C Ruddock
*Assistant Examiner* — Heng Chan
(74) *Attorney, Agent, or Firm* — Scott Servilla; Diehl Servilla LLC; Melanie L. Brown

(57) ABSTRACT

Catalysts, catalyst systems, and methods for removing ammonia and/or carbon monoxide in flue gases are provided where ammonia is used with a selective catalytic reduction catalyst for reducing oxides of nitrogen. A dual oxidation catalyst generally comprises an alkali component, a transition metal, and a metal oxide support. This catalyst is also substantially free from precious metal components and effective for substantially simultaneously oxidizing ammonia ($NH_3$) and carbon monoxide (CO) when placed in an exhaust gas stream. The catalyst is effective to provide low ammonia to nitrogen oxides selectivity.

7 Claims, 3 Drawing Sheets

U.S. PATENT DOCUMENTS

| | | |
|---|---|---|
| 2003/0202927 A1 | 10/2003 | Minkara et al. |
| 2005/0054524 A1* | 3/2005 | Tran et al. ............ 502/312 |
| 2005/0147550 A1 | 7/2005 | Furbeck et al. |
| 2006/0029534 A1 | 2/2006 | Eiteneer et al. |
| 2006/0120936 A1 | 6/2006 | Alive et al. |
| 2006/0182676 A1 | 8/2006 | Tran et al. |

OTHER PUBLICATIONS

Tikhomirov, Kirill et al., "Influence of potassium doping on the activity and the sulfer poisoning resistance of soot oxidation catalysts", *Catalysis Letters*, vol. 109, Nos. 102, (Jun. 2006),49-53.
"PCT/US2007/084631—Search Report—Apr. 23, 2008".
"PCT/US2007/084631—Written Opinion—Apr. 23, 2008".

* cited by examiner

CATALYSTS FOR DUAL OXIDATION OF AMMONIA AND CARBON MONOXIDE WITH LOW TO NO NO$_x$ FORMATION

TECHNICAL FIELD

This invention pertains generally to oxidation catalysts and oxidation catalyst systems for oxidizing both ammonia (NH$_3$) and carbon monoxide (CO), and methods for their manufacture and use in stationary sources, including turbine exhausts.

BACKGROUND OF THE INVENTION

Much of the electrical power used in homes and businesses throughout the world is produced in power plants that burn a fossil fuel (i.e. coal, oil, or gas) in a boiler. The resulting hot exhaust gas (also sometimes termed "flue gas") turns a gas turbine or boils water to produce steam, which turns a steam turbine, and the turbine cooperates with a generator to produce electrical power. The flue gas stream is subsequently passed through an air preheater, such as a rotating wheel heat exchanger that transfers heat from the flue gas to an incoming air stream, which thereafter flows to the combustor. The partially cooled flue gas is directed from the air preheater to the exhaust stack.

The flue gas contains contaminants such as nitrogen oxide (NO$_x$) and carbon monoxide (CO) and particulates of soot when, for example, coal is used as the primary fuel source. The discharge of all of these contaminates into the atmosphere is subject to federal and local regulations, which greatly restrict the levels of these flue gas components.

To meet the reduced levels of NO$_x$ emissions from power stations, as required by environmental regulations, many fossil fuel-fired electric generating units are being equipped with selective catalytic reduction (SCR). In SCR, the most common method used is to inject ammonia or urea based reagents in the presence of a vanadium oxide catalyst where the ammonia reacts to reduce the oxides of nitrogen. The SCR process using ammonia occurs according to chemical equations (1) and (2):

The SCR system typically operates at flue gas temperatures ranging between 300° C. and 450° C. U.S. Pat. No. 5,104,629 illustrates one known type of SCR installation.

One common problem with SCR technology is that some residual ammonia, known as ammonia slip, negatively impacts downstream components and processes such as: air pre-heater fouling, fly ash contamination, and ammonia gas emission into the atmosphere. An additional consequence of SCR technology is that increased ammonia injections will more efficiently remove the oxides of nitrogen, but then the excess ammonia will result in increased ammonia slip in the flue gas.

Because of regulated limits on the amount of ammonia that can be discharged to the atmosphere, there exists a need for a catalyst that can convert ammonia to nitrogen in an oxygen atmosphere without forming NO$_x$. Moreover, there is a further need to reduce the number of catalysts needed at an installation. Therefore, a catalyst with dual functions of converting ammonia to nitrogen and carbon monoxide to carbon dioxide, without the use of a precious metal catalyst which converts carbon monoxide to carbon dioxide while promoting formation of NO$_x$ from ammonia, is desirable.

Further, there is an ongoing need for safe and efficient methods for minimizing ammonia slip downstream from an SCR catalyst.

SUMMARY OF THE INVENTION

Aspects of the present invention include catalysts, catalyst systems, and methods for removing ammonia and/or carbon monoxide in flue gases where ammonia is used with a selective catalytic reduction catalyst for reducing oxides of nitrogen. In one aspect of the present invention, a stationary source catalyst is provided, the catalyst comprising an alkali component and a transition metal both dispersed on a metal oxide support, the catalyst being substantially free from precious metal components and effective to substantially simultaneously oxidize ammonia (NH$_3$) and carbon monoxide (CO) when placed in an exhaust gas stream. Reference to "alkali component" includes both alkali and alkaline earth elements (Group I and II elements), and compounds that contain those elements.

In one embodiment, the catalyst is effective for low selectivity of ammonia to nitrogen oxides. That is, low selectivity of ammonia to nitrogen oxides means that less than or equal to approximately 25% by volume of the NH$_3$ that reacts with the dual oxidation catalyst is converted to NO$_x$. For example, in a gaseous stream containing 15 ppm NH$_3$ that is contacting the catalyst, the stream exiting the dual oxidation catalyst would contain no more than 3-4 ppm NOR.

Reference to "substantially free from precious metal components" means that precious metals may be present at a level of less than or equal to approximately 100 ppm, but the presence of the precious metals does not significantly increase the cost of the catalyst materials. Because catalysts of the present invention are substantially free of precious metals, their costs are reduced, and in some cases this reduction is significant, as compared to oxidation catalysts that comprise significant amounts of precious metals.

In another embodiment, a catalyst system is provided where the catalyst is located on a substrate in the form of a honeycomb and adapted for use in a turbine exhaust stream.

In another aspect, a catalyst system is provided, where the catalyst system comprises an SCR catalyst; an ammonia source upstream of the SCR catalyst; an oxygen source; and a dual oxidation catalyst located downstream of the SCR catalyst, the dual oxidation catalyst comprising an alkali component and a transition metal both dispersed on a metal oxide support, the dual oxidation catalyst being substantially free from precious metal components, the system being located in the exhaust stream of a stationary source and effective to substantially simultaneously oxidize ammonia (NH$_3$) and carbon monoxide (CO).

Other aspects of the invention include methods of preparing catalysts, the methods comprising providing a metal oxide support; impregnating the support with a solution comprising an alkali or alkaline earth component and a transition metal; and drying and calcining the impregnated support to form the catalyst; the catalyst comprising the alkali or alkaline earth component and the transition metal both dispersed on the metal oxide support, the catalyst being substantially free from precious metal components. In a detailed embodiment, the methods include providing a metal oxide support, impregnating the support with a first aqueous solution comprising the alkali or alkaline earth component, drying and calcining the impregnated support, impregnating the support with a second aqueous solution comprising the transition metal, drying and calcining the impregnated support for a second time, and aging the support to form the catalyst.

In accordance with another aspect of the invention there is provided a method of treating an exhaust gaseous stream containing at least NO$_x$, ammonia (NH$_3$), and carbon monoxide (CO), the method comprising contacting the gaseous stream in the presence of a source of oxygen with a dual oxidation catalyst comprising an alkali component and a transition metal both dispersed on a metal oxide support, the catalyst being substantially free from precious metal components and substantially simultaneously oxidizing the NH$_3$ and CO.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the embodiments of which are described in detail and illustrated in the accompanying drawings which form a part hereof, and wherein.

DETAILED DESCRIPTION

Figure 1:
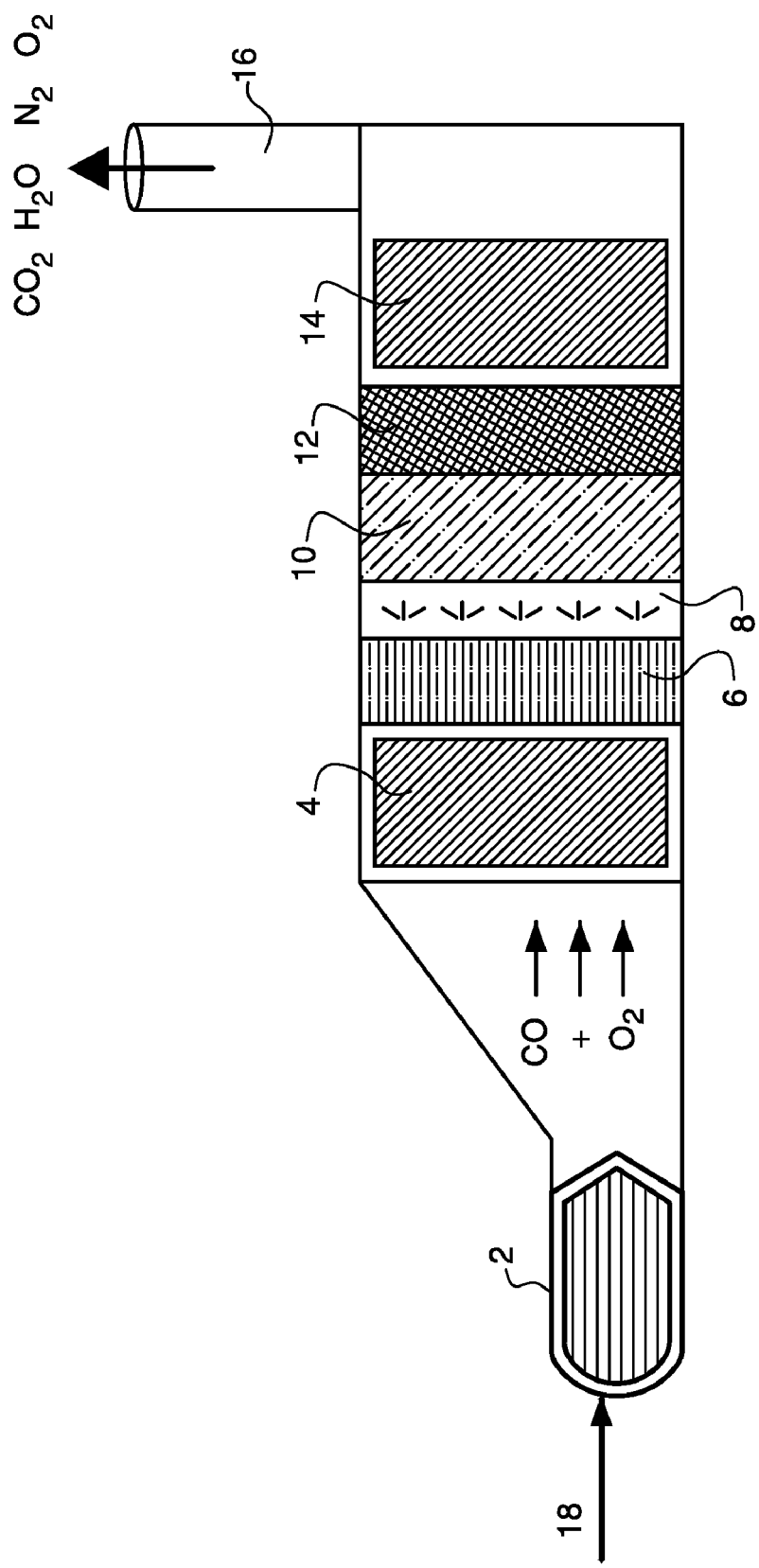
FIG. 1 is a depiction of a catalyst system for the exhaust of a cogeneration combined cycle gas turbine.

Aspects of the present invention include catalysts, catalyst systems, and methods for removing ammonia and/or carbon monoxide in flue gases where ammonia is used with a selective catalytic reduction catalyst for reducing oxides of nitrogen. A dual oxidation catalyst is provided according to one aspect of the present invention. Generally, this catalyst comprises an alkali component, a transition metal, and a metal oxide support. This catalyst is also substantially free from precious metal components and effective to oxidize ammonia (NH$_3$) and carbon monoxide (CO) when placed in an exhaust gas stream. In addition, in one embodiment, the catalyst is effective for having an ammonia to nitrogen oxides selectivity of less than approximately 25% of the ammonia reacted with the catalyst.

In a specific embodiment, the catalyst comprises an alkali component and a transition metal both dispersed on a metal oxide support. For some embodiments, the support comprises ceria, titania, alumina, silica, silica-alumina, alumino-silicates, alumina-zirconia, alumina-chromia, alumina-ceria, or combinations thereof. The alkali component of many embodiments comprises an alkaline earth metal, an alkali metal, or combinations thereof. It may be desirable that the alkali component is an oxide of the alkaline earth metal and/or alkali metal. In a specific embodiment, the alkali component comprises Mg, Ba, K, or combinations thereof. Regarding the transition metal, in certain embodiments, the transition metal comprises V, Cr, Mo, Mn, Fe, Co, Ni, Cu, Zn, Ag, or combinations thereof. It may be desirable that the transition metal component is an oxide.

A detailed embodiment includes a Mn-based catalyst wherein the support comprises ceria; the alkali component comprises K, Ba, Mg, or combinations thereof; and the transition metal comprises Mn. In an embodiment, this catalyst comprises approximately less than or equal to 10% by weight of K, Ba, Mg expressed as an oxide, or combinations thereof; and approximately less than or equal to 10% by weight of Mn expressed as an oxide. Reference to "expressed as an oxide" means that for purposes of measuring of the element, an oxide of the element was measured, but this does not imply that the element is present as purely an oxide. In the final form of the catalyst, the element may be present in a form other than an oxide, such as a mixed metal.

Other aspects of the present invention include catalyst systems which comprise a catalyst located on a substrate in the form of a honeycomb and adapted for use in a turbine exhaust stream. The system can further include an SCR catalyst.

For example, the dual oxidation catalyst of this invention can be placed downstream from the SCR catalyst to reduce the ammonia and CO concentrations in exiting flue gases without formation of NO$_x$ according to the chemical formulas (3) and (4):

$$4NH_3 + 3O_2 \rightarrow 2N_2 + 6H_2O \quad (3)$$

$$CO + \tfrac{1}{2}O_2 \rightarrow CO_2 \quad (4).$$

Undesirable side-reactions that are possible when oxidizing ammonia slip include chemical formulas (5), (6), and (7):

$$2NH_3 + 2O_2 \rightarrow N_2O + 3H_2O \quad (5)$$

$$4NH_3 + 5O_2 \rightarrow 4NO + 6H_2O \quad (6)$$

$$4NH_3 + 7O_2 \rightarrow 4NO_2 + 6H_2O \quad (7).$$

As such, in another aspect, a catalyst system is provided, where the catalyst system comprises an SCR catalyst; an ammonia source upstream of the SCR catalyst; an oxygen source; and a dual oxidation catalyst located downstream of the SCR catalyst, the dual oxidation catalyst comprising an alkali component and a transition metal both dispersed on a metal oxide support, the dual oxidation catalyst being substantially free from precious metal components, the system being located in the exhaust stream of a stationary source and effective to substantially simultaneously oxidize ammonia (NH$_3$) and carbon monoxide (CO).

In accordance with another aspect of the invention there is provided a method of treating an exhaust gaseous stream containing at least NO$_x$, ammonia (NH$_3$), and carbon monoxide (CO), the method comprising contacting the gaseous stream in the presence of a source of oxygen with a dual oxidation catalyst comprising an alkali component and a transition metal both dispersed on a metal oxide support, the catalyst being substantially free from precious metal components and substantially simultaneously oxidizing the NH$_3$ and CO. In one embodiment, a temperature of the gaseous stream is from approximately 300° C. to approximately 500° C. For another embodiment, the gaseous stream comprises approximately 15 ppm NH$_3$ and 25 ppm CO before contact with the dual catalyst. Another embodiment has a concentration of oxygen in the gaseous stream being approximately 10% by volume.

One further aspect of the invention pertains to methods of preparing catalysts and catalyst compositions. The methods comprise providing a metal oxide support; impregnating the support with a solution comprising an alkali or alkaline earth component and a transition metal; and drying and calcining the impregnated support to form the catalyst. In a detailed embodiment, the methods include providing a metal oxide support, impregnating the support with a first aqueous solution comprising the alkali or alkaline earth component, drying and calcining the impregnated support, impregnating the support with a second aqueous solution comprising the transition metal, drying and calcining the impregnated support for a second time, and aging the support to form the catalyst.

Substrates

In one or more embodiments, one or more catalyst compositions are disposed on a substrate. The substrate may be any of those materials typically used for preparing catalysts, and will preferably comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 600 or more gas inlet openings (i.e., cells) per square inch of cross section.

The substrate can also be a wall-flow filter substrate, where the channels are alternately blocked, allowing a gaseous stream entering the channels from one direction (inlet direction), to flow through the channel walls and exit from the channels from the other direction (outlet direction). A dual oxidation catalyst composition can be coated on the wall-flow filter. If such substrate is utilized, the resulting system will be able to remove particulate matters along with gaseous pollutants. The wall-flow filter substrate can be made from materials commonly known in the art, such as cordierite or silicon carbide.

The ceramic substrate may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alumina, an aluminosilicate and the like.

The substrates useful for the catalysts of the present invention may also be metallic in nature and be composed of one or more metals or metal alloys. The metallic substrates may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. The surface of the metal substrates may be oxidized at high temperatures, e.g., 1000° C. and higher, to improve the resistance to corrosion of the alloys by forming an oxide layer on the surfaces of the substrates. Such high temperature-induced oxidation may enhance the adherence of the refractory metal oxide support and catalytically promoting metal components to the substrate.

In alternative embodiments, one or more catalyst compositions may be deposited on an open cell foam substrate. Such substrates are well known in the art, and are typically formed of refractory ceramic or metallic materials.

Preparation of Washcoats

The catalyst compositions of the present invention may be readily prepared by processes well known in the prior art. A representative process for preparing a bi-layer washcoat set forth below. It will be understood that the process below can be varied according to different embodiments of the invention to prepare single layer washcoats, by omitting the step of applying the second layer, or to add one or more additional layers to the bi-layer washcoat described below.

The catalyst composite can be readily prepared in one or more layers on a monolithic honeycomb substrate. For a bi-layer washcoat, the bottom layer, finely divided particles of a high surface area metal oxide such as ceria or titania are slurried in an appropriate vehicle, e.g., water. The substrate may then be dipped one or more times in such slurry or the slurry may be coated on the substrate (e.g., honeycomb flow through substrate) such that there will be deposited on the substrate the desired loading of the metal oxide. Components such as stabilizers, promoters and the like may be incorporated in the slurry as a mixture of water soluble or water-dispersible compounds or complexes. Thereafter, the coated substrate is typically calcined by heating, e.g., at 400 to 600° C. for 1 to 3 hours.

In one or more embodiments, the slurry is comminuted to result in substantially all of the solids having particle sizes of less than 20 microns, e.g., 1-15 microns, in an average diameter. The comminution may be conducted in a ball mill or other similar equipment, and the solids content of the slurry may be, e.g., 20-60 wt. %, preferably 35-45 wt. %.

Before describing several exemplary embodiments of the invention, it is to be understood that the invention is not limited to the details of construction or process steps set forth in the following description. The invention is capable of other embodiments and of being practiced in various ways.

In FIG. 1, an example of a catalyst system for the exhaust of a cogeneration combined cycle gas turbine 2 is depicted. Air 18 is supplied to the system to combust the fuel, for example, coal or natural gas in the boiler (not shown). Hot exhaust gases including at least $O_2$ and CO exit from the turbine 2 (which in response turns a generator, not shown, to create electricity) and pass over a first heat recovery steam generator 4, where the heat from the exhaust gases is transferred to water thereby generating steam. An optional catalyst 6, for oxidizing, for example, carbon monoxide to carbon dioxide, is provided after the first heat recovery steam generator 4. In one embodiment, the oxidation catalyst 6 is omitted because of the presence of the dual oxidation catalyst 12 of the present invention. An ammonia injection grid 8 is provided, so that ammonia can be used to reduce $NO_x$ in conjunction with an SCR catalyst 10 in accordance with formulas (1) and (2). The dual oxidation catalyst is present to substantially simultaneously oxidize $NH_3$ and CO according to formulas (3) and (4). Oxygen from the air source 18 is typically present for this reaction. If necessary, a separate source of $O_2$ can be used. The exhaust gases pass over a second heat recovery steam generator 14 and then exit through a stack 16 to the atmosphere.

The following examples further illustrate the present invention, but of course, should not be construed as in any way limiting its scope.

EXAMPLES

Catalyst Preparation

The catalysts were prepared using the following general procedure. A high surface area metal oxide support was impregnated with a first aqueous solution of an alkali component, for example, an alkali or alkaline earth component; specifically, K, Ba, and Mg. The impregnated solid was then dried at 90° C. for 16 hours and then calcined at 540° C. for 2 hours. The calcined solid was then impregnated with a second aqueous solution having a transition metal compound. This material was then dried at 90° C. for 16 hours and then calcined at 540° C. for 2 hours. The resulting solid was optionally aged at 500° C. for 16 hours in 10% steam (balance air). Several catalysts were prepared from a support chosen from ceria, titania, or alumina in combination with from approximately 1 to 3 weight % of a transition metal (Mn), expressed as an oxide, and with from approximately 1 to 2 weight % of an alkali component (Mg, Ba, or K), expressed as an oxide.

Catalyst Evaluation

Catalysts were evaluated by washcoating the catalyst powder onto a small cylindrical cordierite monolith (¾ diameter× 1.0" length) of 64 cells/in$^3$ by dip-coating the monolith into an aqueous slurry of the catalyst by standard techniques. Final catalyst loading was typically 2.5-3.0 g/in$^3$. Catalysts were compared in the examples below at similar loadings and equivalent space velocities.

Analysis of the performance of these samples was accomplished by using a tubular flow through reactor. A simulated exhaust gas feedstream was passed through a sample of the dual oxidation catalyst on 64 cell-per-square inch cordierite monolith substrate. The reactor system was instrumented with appropriate sensors, including a Fourier transform infrared spectrometer to determine CO concentration levels (and other species) entering/exiting the dual oxidation catalyst, and a flow meter to determine exhaust flow rate translatable to catalyst space velocity (SV). Space velocity represents a rate of feed of gas, in volume, per unit volume of the catalyst, and has a unit of inverse hour (hr$^{-1}$).

Baseline laboratory conditions for the Mn-based catalysts included the following standard gases in the simulated exhaust feedstream: 15 ppm $NH_3$, 25 ppm CO, 15% by volume $O_2$, 10% by volume $H_2O$, and balance $N_2$. The catalyst space velocity was 70,000 hr$^{-1}$, using a 64 cpsi honeycomb. Conversions of $NH_3$ and CO were evaluated at 300, 350, 400, 450, and 500° C.

Example 1

A catalyst of approximate composition 3% $MnO_2$/1% $K_2O$/ceria was prepared by starting with 100 g of ceria to which 44.232 ml of 0.5 M KOH was added. The material was dried at 90° C. for 16 hours and then calcined at 540° C. for 2 hours. To this, 17.972 ml of 2.0M $Mn(NO_3)_2$ was added. This material was then dried at 90° C. for 16 hours and then calcined at 540° C. for 2 hours. The resulting solid was aged at 500° C. for 16 hours in 10% steam (balance air).

The catalyst was coated onto a honeycomb monolith using deposition methods known in the art for depositing the catalyst on a foraminous substrate. Methods for depositing the catalyst on the foraminous substrate include, for example, disposing the catalyst in a liquid vehicle to form a slurry and wetting the foraminous substrate with the slurry by dipping the substrate into the slurry, spraying the slurry onto the substrate, and the like.

Example 2

A catalyst of approximate composition 3% $MnO_2$/1% MgO/ceria was prepared by starting with 100 g of ceria to which 25.841 ml of 1.0M $Mg(NO_3)_2$ was added. The material was dried at 90° C. for 16 hours and then calcined at 540° C. for 2 hours. To this, 17.972 ml of 2.0M $Mn(NO_3)_2$ was added. This material was then dried at 90° C. for 16 hours and then calcined at 540° C. for 2 hours. The resulting solid was aged at 500° C. for 16 hours in 10% steam (balance air).

Example 3

A catalyst of approximate composition 3% $MnO_2$/1% BaO/ceria was prepared by starting with 100 g of ceria to which 6.793 ml of 1.0M $Ba(CH_3CO_2)_2$ was added. The material was dried at 90° C. for 16 hours and then calcined at 540° C. for 2 hours. To this, 17.972 ml of 2.0M $Mn(NO_3)_2$ was added. This material was then dried at 90° C. for 16 hours and then calcined at 540° C. for 2 hours. The resulting solid was aged at 500° C. for 16 hours in 10% steam (balance air).

Example 4

CO and $NH_3$ Conversion by Mn-Based Ceria Catalysts

Figure 2:
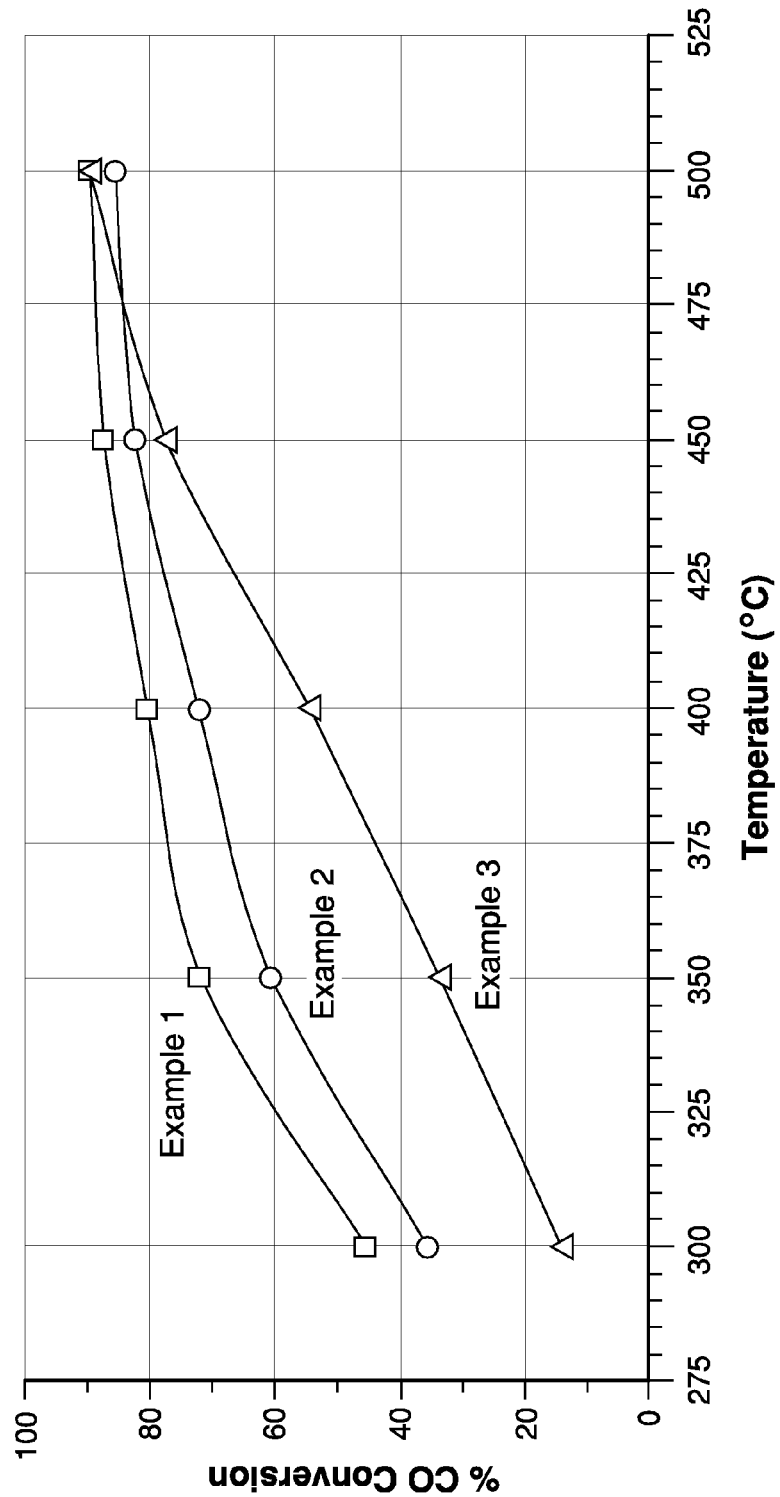
FIG. 2 is a graph comparing the conversion of CO at various temperatures (° C.) using a dual oxidation catalyst in accordance with the present invention.
Figure 3:
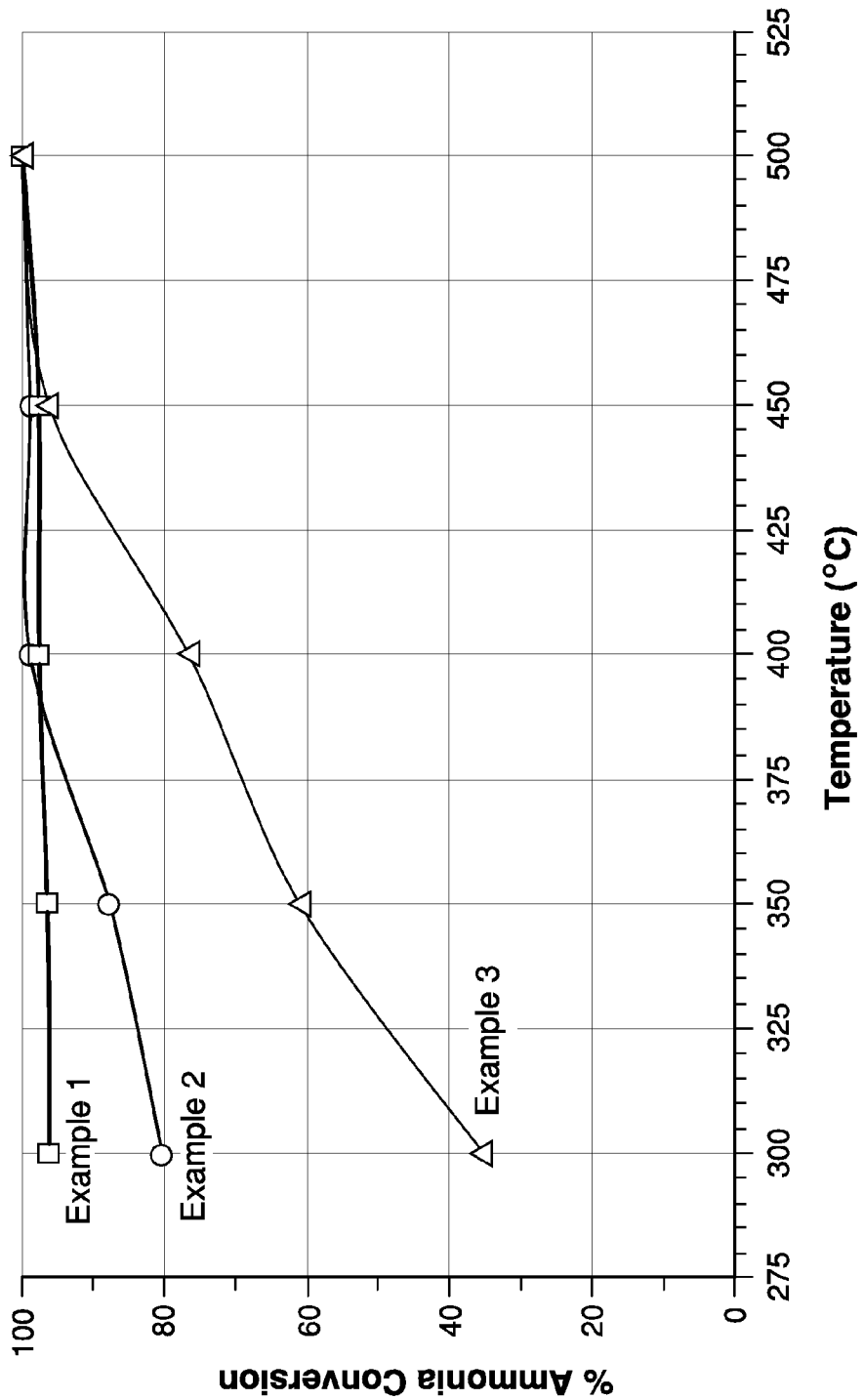
FIG. 3 is a graph comparing the conversion of NH$_3$ at various temperatures (° C.) using a dual oxidation catalyst in accordance with the present invention.

CO conversions over a range of temperatures from 300 to 500° C. of the Mn-based ceria catalysts containing ceria, 3% $MnO_2$, and 1% $K_2O$, BaO, or MgO are provided in FIG. 2. $NH_3$ conversions over a range of temperatures from 300 to 500° C. of the Mn-based ceria catalysts containing ceria, 3% $MnO_2$, and 1% $K_2O$, BaO, or MgO are provided in FIG. 3.

The catalyst containing $K_2O$ showed the best conversions of CO and $NH_3$. For temperatures of 400° C. and greater, the CO conversion was 80% or greater and the $NH_3$ conversion was greater than 95%. Generally, conversions increased with increasing temperature.

Example 5

Comparative Example

A catalyst of approximate composition 10% $MnO_2$/alumina was prepared by standard techniques to impregnate the alumina with manganese. This material dried, calcined, and aged under conditions comparable to those of Examples 1, 2, and 3. $NH_3$ conversions of the Mn-alumina catalyst under conditions the same as for Examples 1, 2, and 3 are provided in Table 1. Compared to the $NH_3$ conversions shown in FIG. 3, the catalysts of Examples 1 and 2, Mn/K/ceria and Mn/Mg/ceria, respectively, showed improved conversions of $NH_3$ at every temperature compared to the conversions achieved by the Mn-alumina catalyst. The catalyst of Example 3 showed improved conversions of $NH_3$ at every temperature except for 300° C. compared to the conversions achieved by the Mn-alumina catalyst.

TABLE 1

| Temperature, ° C. | % $NH_3$ Conversion Mn-alumina catalyst |
|---|---|
| 300 | 43 |
| 350 | 50 |
| 375 | 60 |
| 400 | 70 |
| 450 | 83 |
| 500 | 87 |

The invention has been described with specific reference to the embodiments and modifications thereto described above. Further modifications and alterations may occur to others upon reading and understanding the specification. It is intended to include all such modifications and alterations insofar as they come within the scope of the invention.

What is claimed is:

1. A stationary source catalyst for use in a stationary source exhaust gas stream comprising an alkali component that comprises K, Ba, Mg, or combinations thereof and a transition metal that comprises manganese (Mn) both dispersed on a metal oxide support comprising ceria, the catalyst being substantially free from precious metal components and effective to substantially simultaneously oxidize ammonia ($NH_3$) and carbon monoxide (CO) when placed in the exhaust gas stream and being adapted for use in a turbine exhaust stream; wherein the total weight of the catalyst including the alkali component, the transition metal, and the metal oxide support comprises precious metals at a level of less than or equal to approximately 100 ppm, approximately 1% by weight of K, Ba, Mg expressed as an oxide, or combinations thereof and approximately 1 to 3% by weight of Mn expressed as an oxide.

2. The catalyst of claim 1, wherein the catalyst is effective for having an ammonia to nitrogen oxides selectivity of less than approximately 25% of the ammonia reacted with the catalyst.

3. A catalyst system comprising a catalyst according to claim 1 located on a substrate in the form of a honeycomb.

4. The catalyst system of claim 3 further comprising a Selective Catalytic Reduction (SCR) catalyst.

5. A catalyst system comprising:
a stationary source;
a Selective Catalytic Reduction (SCR) catalyst;
an ammonia source upstream of the SCR catalyst;
an oxygen source; and
a dual oxidation catalyst located downstream of the SCR catalyst, the dual oxidation catalyst comprising the stationary source catalyst of claim 1.

6. The catalyst of claim 5, wherein the stationary source catalyst is effective for having an ammonia to nitrogen oxides selectivity of less than approximately 25% of the ammonia reacted with the catalyst.

7. The catalyst of claim 1, wherein the total weight of the catalyst including the alkali component, the transition metal, and the metal oxide support comprises the metal oxide support that is ceria of an amount of approximately 96-98% by weight as expressed as an oxide.

* * * * *